United States Patent
Feldmann

(10) Patent No.: US 10,479,340 B2
(45) Date of Patent: Nov. 19, 2019

(54) OVERLOAD PROTECTION FOR A PARKING LOCK

(71) Applicant: AUDI AG, Ingolstadt (DE)

(72) Inventor: Uwe Feldmann, Nassenfels (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 15/378,877

(22) Filed: Dec. 14, 2016

(65) Prior Publication Data

US 2017/0182993 A1 Jun. 29, 2017

(30) Foreign Application Priority Data

Dec. 23, 2015 (DE) .......................... 10 2015 016 711

(51) Int. Cl.
*B60T 13/00* (2006.01)
*B60T 17/22* (2006.01)
*B60T 13/74* (2006.01)

(52) U.S. Cl.
CPC ............ *B60T 17/221* (2013.01); *B60T 13/74* (2013.01)

(58) Field of Classification Search
None
See application file for complete search history.

(56) References Cited

U.S. PATENT DOCUMENTS

| | | | |
|---|---|---|---|
| 5,717,134 A * | 2/1998 | Schlichenmaier | B60T 13/683 340/453 |
| 6,256,568 B1 | 7/2001 | Siepker et al. | |
| 2004/0201270 A1 * | 10/2004 | Suzuki | B60T 13/741 303/20 |
| 2008/0021623 A1 | 1/2008 | Davidovici | |
| 2013/0096796 A1 * | 4/2013 | Lee | B60T 7/085 701/70 |
| 2013/0252784 A1 * | 9/2013 | Kinoshita | B60W 10/182 477/92 |
| 2013/0282249 A1 * | 10/2013 | Heise | B60T 7/042 701/70 |

FOREIGN PATENT DOCUMENTS

| | | |
|---|---|---|
| CN | 103502699 A | 1/2014 |
| CN | 104847890 A | 8/2015 |
| DE | 198 04 640 A1 | 8/1999 |
| DE | 198 31 733 A1 | 1/2000 |
| DE | 199 64 419 B4 | 6/2001 |
| DE | 10 2004 047 100 B3 | 3/2006 |
| DE | 10 2005 046 278 A1 | 4/2006 |
| EP | 1750985 A1 | 2/2007 |
| JP | 09322428 A * | 12/1997 |
| WO | WO 2005/110831 | 11/2005 |

OTHER PUBLICATIONS

Machine translation of JP 09322428 (Year: 2017).*

(Continued)

*Primary Examiner* — Nicholas J Lane
(74) *Attorney, Agent, or Firm* — Henry M. Feiereisen LLC

(57) ABSTRACT

A parking lock of a vehicle is normally controlled by a first control unit. In the presence of a predefined condition, control of the parking lock is assumed by a second control unit of the vehicle and the first control unit is disabled, at least in part, when the predefined condition is present.

8 Claims, 1 Drawing Sheet

(56) References Cited

OTHER PUBLICATIONS

Stark; Schuch: "Innovative Technologien für Getriebesteuerungen", 9.Schaeffler Kolloquium, Apr. 13-14, 2010, S. 190-203, Firmenschrift and English translation thereof.
Chinese Search Report dated May 11, 2018 with respect to counterpart Chinese patent application 201611198737.4.
Translation of Chinese Search Report dated May 11, 2018 with respect to counterpart Chinese patent application 201611198737.4.

* cited by examiner

OVERLOAD PROTECTION FOR A PARKING LOCK

CROSS-REFERENCES TO RELATED APPLICATIONS

This application claims the priority of German Patent Application, Serial No. 10 2015 016 711.1, filed Dec. 23, 2015, pursuant to 35 U.S.C. 119(a)-(d), the disclosure of which is incorporated herein by reference in its entirety as if fully set forth herein.

BACKGROUND OF THE INVENTION

The present invention relates to an overload protection for a parking lock.

The following discussion of related art is provided to assist the reader in understanding the advantages of the invention, and is not to be construed as an admission that this related art is prior art to this invention.

A parking lock is normally used to hold a vehicle in position during a parking maneuver of the vehicle. When using electronic parking locks, situations can be encountered, in which a repeated engagement and release of the parking lock can cause malfunction in a control unit that operates the parking lock as a result of a temperature increase for example.

It would be desirable and advantageous to provide an improved overload protection to obviate prior art shortcomings.

SUMMARY OF THE INVENTION

According to one aspect of the present invention, a method includes normally controlling a parking lock of a vehicle by a first control unit, in the presence of a predefined condition, controlling the parking lock by a second control unit of the vehicle, and disabling the first control unit, at least in part, in the presence of the predefined condition.

A method according to the present invention is provided in particular for controlling a parking lock, when encountering a defect, e.g. when the first control unit, also referred to as parking lock control unit, no longer operates properly or a malfunction is imminent, as a result of a thermal or other physical load. To protect the parking lock control unit against malfunctioning, operativeness of the parking lock control unit is assumed or replicated by a second control unit, when a predefined condition is encountered, such as, e.g., when a temperature within the parking lock control unit or in a region of the parking lock control unit is increased compared to normal operation, so that the parking lock control unit is disabled or deactivated, at least in part, to allow the parking lock control unit to cool down or to reach its normal state.

To ensure clarity, it is necessary to establish the definition of several important terms and expressions that will be used throughout this disclosure.

The term, "parking lock" relates to a device intended to secure a vehicle in a parking position.

The term "parking lock control unit" relates to a control unit for controlling a parking lock of a vehicle and can involve a drive control unit or motor control unit configured to operate a parking lock. A parking lock control unit may also be integrated in an actuator for actuating of, for example, a parking brake or parking lock and form a so-called 'smart actuator".

The term "disabled at least in part" relates to a deactivation of at least one component of a parking lock control unit, e.g. an end stage of the parking lock control unit. Of course, the parking lock control unit can also be disabled in its entirety.

According to another advantageous feature of the present invention, the presence of the predefined condition can be affirmed, when a measurement value corresponds to at least one predefined value selected from the group consisting of temperature of the parking lock control unit, number of actuations of the parking lock in a predefined time period, current applied to the parking lock control unit, voltage applied to the parking lock control unit, current outputted by the parking lock control unit, voltage outputted by the parking lock control unit, and combinations thereof.

According to another advantageous feature of the present invention, the presence of the predefined condition can be affirmed, when the parking lock has been actuated a number of times within a predefined time period. For example, when a user "plays" with the parking lock, i.e. the user disengages and engages the parking lock for example ten times per minute, the second control unit becomes effective to assume control of the parking lock and to temporarily disable, at least in part, the parking lock control unit.

According to another advantageous feature of the present invention, the parking lock can be a parking brake controlled by the second control unit.

In order to relieve the parking lock control unit, provision may be made to operate only a selection of components of the parking lock, such as, e.g., an electric motor or a gear mechanism, via a respective control unit of a corresponding component. Thus, for example, when the parking lock control unit operates an electric motor or a gear mechanism, it is the electric motor or the gear mechanism that secures the vehicle in position in the event the parking lock control unit, or a respective smart actuator, is disabled, at least in part. It is, of course, also conceivable to operate both the electric motor and the gear mechanism by respective control units independently from one another and independently from the parking lock control unit so as to secure the vehicle in position.

According to another advantageous feature of the present invention, when the second control unit assumes operation of the parking lock, the second control unit can be configured to replicate a functionality of the parking lock control unit. In order to ensure functionality of the parking lock of the vehicle, even when the parking lock control unit has been disabled, at least in part, the second control unit assumes the functionality of the parking lock control unit and operates the parking lock in a same way as the parking lock control unit would have operated the parking lock. Thus, it is possible to have the second control unit simulate or emulate the operation of the parking lock control unit, so that the functionality of the parking lock control unit is expanded.

It is conceivable that a command for activating a simulation of the parking lock control unit on the second control unit is triggered when the parking lock control unit is disabled, at least in part, by having the parking lock control unit transmit immediately before being disabled a corresponding command to the second control unit. Of course, it is also conceivable that the second control unit transmits a deactivation command to the parking lock control unit, when the parking lock control unit has to be disabled, at least in part, and begins to simulate the parking lock control unit.

According to another advantageous feature of the present invention, the second control unit can be configured to operate a brake of the vehicle. Brakes typically include their own control units which are constructed very durable to meet stringent safety requirements. Thus, the use of these control units is suitable and advantageous to assume the functions of the parking lock control unit. In addition, a control unit for a brake can be used to reliably secure a vehicle in position regardless of a functionality of the parking lock or parking lock control unit, so that the brake of the vehicle can be used to secure the vehicle in position, even when a servomotor of the parking lock or the parking lock control unit fails.

According to another advantageous feature of the present invention, a temperature of the parking lock control unit can be continuously monitored, when the predefined condition relates to the presence of a specific temperature of the parking lock control unit. In order to detect in time an impending malfunction of the parking lock control unit and to thus disable, at least in part, the parking lock control unit prior to malfunction and to activate the second control unit, an actual temperature can be ascertained and analyzed in the parking lock control unit or in a region around the parking lock control unit. Through comparison with a predefined threshold value for example, it becomes possible to activate or to disable, at least in part the parking lock control unit dynamically as a function of the actual temperature, without risking damage to the components of the parking lock control unit.

According to another advantageous feature of the present invention, a functionality of the first control unit can be continuously monitored, when the predefined condition relates to the presence of a specific state of a functionality of the first control unit. To determine a time instance for activating or deactivating the parking lock control unit or to determine the presence of the predefined condition, the presence of an actual functionality of the parking lock control unit can be used, when the predefined condition is linked to a general functionality of the parking lock control unit, apart from a control of an actual temperature or temperature profile in or on the parking lock control unit, when the predefined condition relates to a temperature of the parking lock control unit. Thus, when the parking lock control unit outputs an error message, provision can be made for the second control unit to assume the control of the parking lock and to automatically disable the parking lock control unit, at least in part. Once the triggering condition no longer exists, the parking lock control unit can be enabled again.

According to another aspect of the present invention, a vehicle includes an electronic parking lock, a first control unit configured to control the parking lock, and a second control unit configured to control the parking lock and to disable the first control unit, at least in part, in response to the presence of a predefined condition.

According to another advantageous feature of the present invention, the second control unit can be configured to replicate a functionality of the first control unit for controlling the parking lock.

According to another advantageous feature of the present invention, a display unit can be operably connected to the second unit so as to indicate, in response to the presence of the predefined condition, to a user that control of the parking lock has been assumed by the second control unit.

Advantageously, a warning signal or an optical display may be provided to inform the user about an improper operation, for example, when the parking lock is engaged and released repeatedly, so that the user is able to recognize the improper operation and its effect and is able to take corrective measures.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
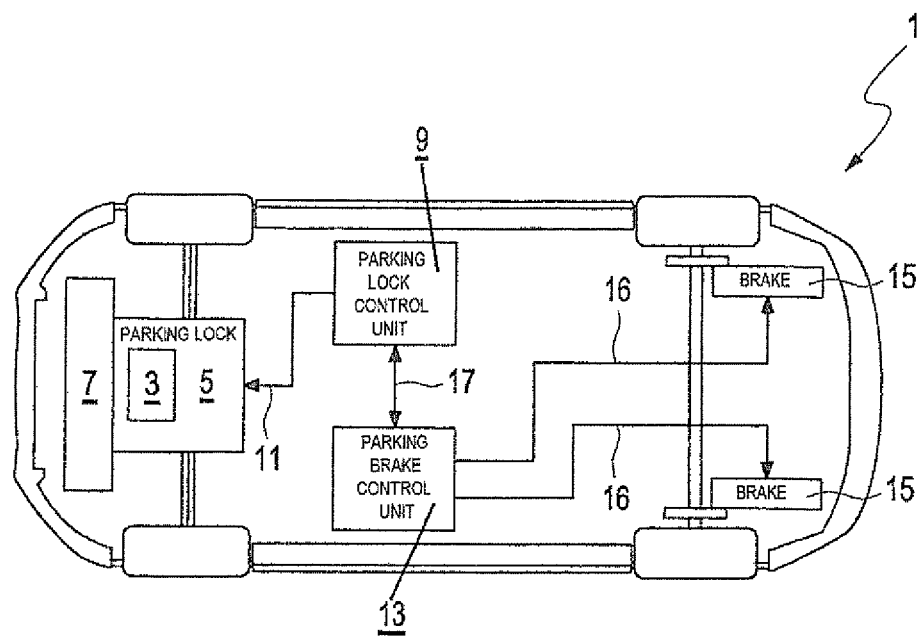
FIG. 1 is a schematic illustration of a functional principle of a method of controlling a parking lock in a vehicle in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a functional principle of a method of controlling a parking lock 3 in a vehicle, generally designated by reference numeral 1, in accordance with the present invention. The vehicle 1 includes the parking lock 3 having a gear mechanism 5 and an electric motor 7. The parking lock 3 is operated by a first parking lock control unit 9 in order to secure the vehicle 1 in a parking position for example, as indicated by arrow 11. The vehicle 1 further includes a second control unit 13, e.g. a parking brake control unit for operating parking brakes 15, as indicated by arrows 16. In order to disable the parking lock control unit 9, at least in part, in the event of an imminent overload caused, for example, by an unexpected constant operation and to thereby protect the parking lock control unit 9 from thermal damage for example, a functionality of the parking lock control unit 9 is transferred in the event of malfunction, i.e. when the parking lock control unit 9 indicates a fault, onto the parking brake control unit 13, as indicated by arrow 17.

As soon as the functionality of the parking lock control unit 9 has been transferred to the parking brake control unit 13, the parking brake control unit 13 assumes all functions that are need to control the parking lock 3. Provision can hereby be made in particular for providing on the parking brake control unit 13 a virtual entity of the parking lock control unit 9 for generating corresponding control commands for operating the parking lock 3.

Figure 2:
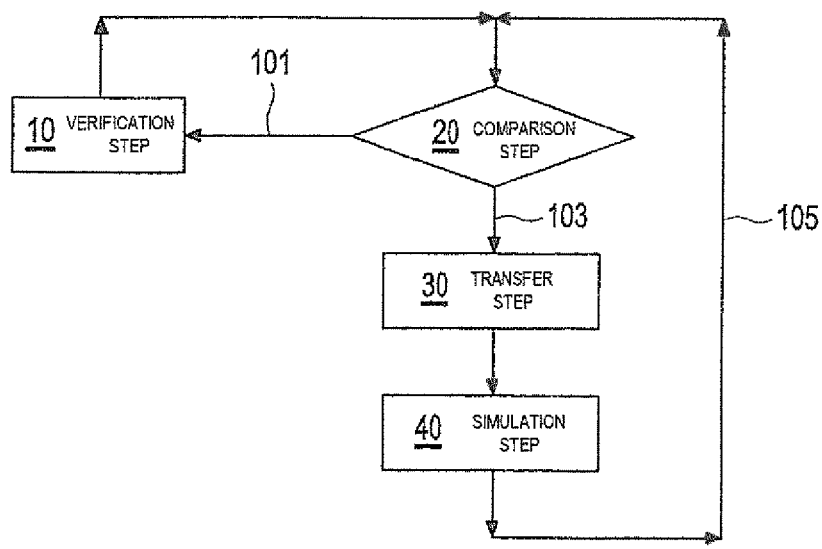
FIG. 2 is a flow diagram of a method of controlling a parking lock in accordance with the present invention.

FIG. 2 shows a flow diagram to describe in further detail the method of controlling the parking lock 3 in accordance with the present invention. Step 10 relates to a verification step to check whether the parking lock control unit 9 of the vehicle 1 operates normally, i.e. has a functionality that is provided for normal operation. For this purpose, an error memory of the parking lock control unit 9 may be read out or various parameters of the parking lock control unit 9, such as, e.g., its current temperature or currently applied or outputted voltage, can be determined and compared with predefined conditions, such as, e.g., respective threshold values. This is indicated by comparison step 20. When the comparison step 20 results in an outcome that the functionality of the parking lock control unit 9 is not compromised and is not outside a normal operation, the parking lock control unit 9 remains in an activated state. Corresponding control signals are generated to maintain the current setting and transmitted to the parking lock control unit 9 according to arrow 101.

In the event the verification step 10 determines that functionality of the parking lock control unit 9 is outside the normal range thereof, thereby causing generation of error messages for example, as indicated by arrow 102, operation of the parking lock 3 is transferred from the parking lock control unit 9 to a second control unit, such as, e.g., parking brake control unit 13, of the vehicle 1, as indicated by transfer step 30.

In order for the second control unit 13 to execute the functions, as transferred in the transfer step 30, for controlling the parking lock 9, a simulation step 40 is executed to replicate the functions in of the parking lock control unit 9 by the second control unit 13. Thus, the second control unit 13 generates control commands for operating the parking lock 3. To avoid redundant execution of control commands and to relieve the parking lock control unit 9, the second control unit 13 sends a deactivation command to the parking lock control unit 9, as indicated by arrow 105.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method, comprising:
   normally controlling a parking lock of a vehicle by a first control unit;
   measuring all measurement values from the group consisting of temperature of the first control unit, number of actuations of the parking lock in a predefined time period, current applied to the first control unit, voltage applied to the first control unit, current outputted by the first control unit and voltage outputted by the first control unit;
   in the presence of a predefined condition, controlling the parking lock by a second control unit of the vehicle; and
   disabling the first control unit, at least in part, in the presence of the predefined condition,
   wherein the presence of the predefined condition is affirmed, when one of the measurement values corresponds to a respective one of predefined values.

2. The method of claim 1, wherein further comprising controlling the parking lock is a parking brake of the vehicle controlled by the second control unit.

3. The method of claim 1, further comprising replicating by the second control unit a functionality of the first control unit, when the parking lock is operated by the second control unit.

4. The method of claim 1, wherein the second control unit is configured to operate a brake of the vehicle.

5. The method of claim 1, further comprising continuously monitoring a functionality of the first control unit, when the predefined condition relates to the presence of a specific state of a functionality of the first control unit measuring all measuring values.

6. A vehicle, comprising:
   an electronic parking lock;
   a first control unit configured to normally control the parking lock and to measure all measurement values from the group consisting of temperature of the first control unit, number of actuations of the parking lock in a predefined time period, current applied to the first control unit, voltage applied to the first control unit, current outputted and voltage outputted by the first control unit; and
   a second control unit configured to control the parking lock in presence of a predefined condition, with the presence of the predefined condition being affirmed when one of the measurement values corresponds to a respective one of predefined values, and to disable the first control unit at least in part in the presence of the predefined condition.

7. The vehicle of claim 6, wherein the second control unit is configured to replicate a functionality of the first control unit for controlling the parking lock.

8. The vehicle of claim 6, further comprising a display unit operably connected to the second control unit so as to indicate, in response to the presence of the predefined condition, to a user that control of the parking lock has been assumed by the second control unit.

* * * * *